M. PEARL & C. F. REINMANN.
COVER FOR CULINARY VESSELS.
APPLICATION FILED NOV. 20, 1909. RENEWED AUG. 23, 1912.
1,055,073.
Patented Mar. 4, 1913.
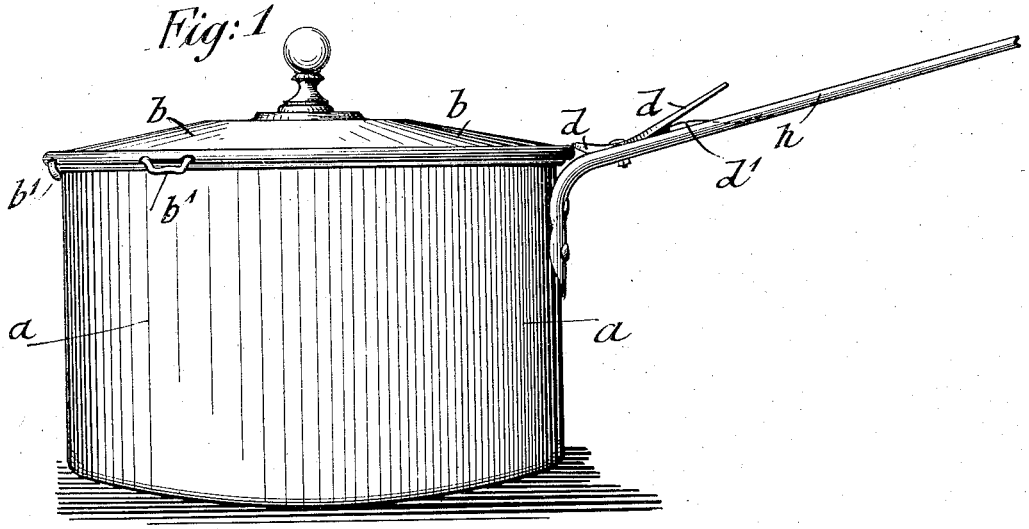
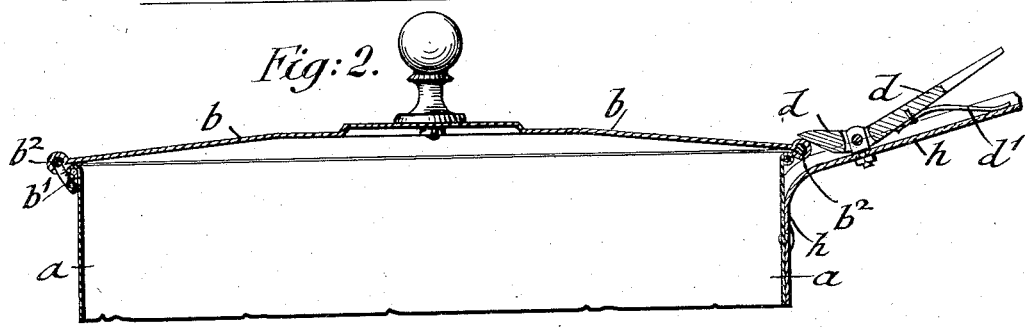
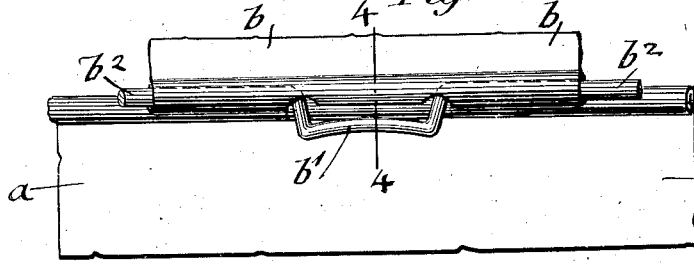
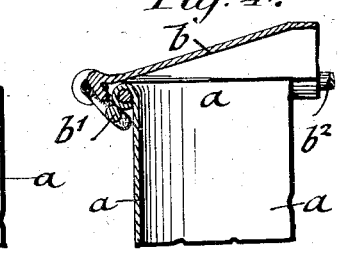
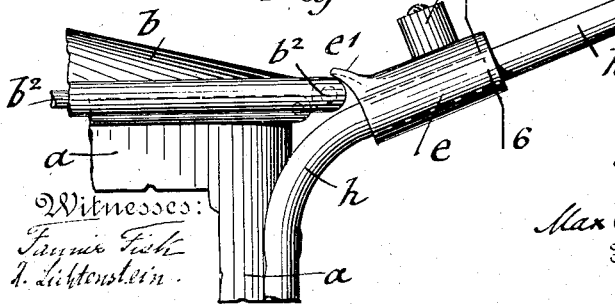
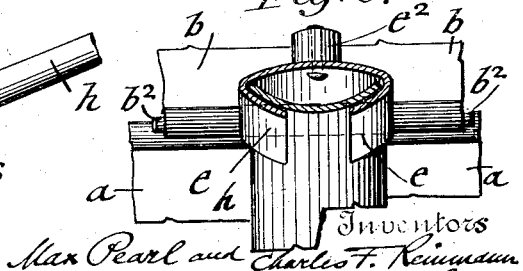

UNITED STATES PATENT OFFICE.

MAX PEARL AND CHARLES F. REINMANN, OF NEW YORK, N. Y.; SAID REINMANN ASSIGNOR TO SAID PEARL.

COVER FOR CULINARY VESSELS.

1,055,073.  Specification of Letters Patent.  Patented Mar. 4, 1913.

Application filed November 20, 1909, Serial No. 529,086. Renewed August 23, 1912. Serial No. 716,747.

*To all whom it may concern:*

Be it known that we, MAX PEARL and CHARLES F. REINMANN, citizens of the United States of America, residing in New York, in the borough of Brooklyn, county of Kings, and State of New York, have invented certain new and useful Improvements in Covers for Culinary Vessels, of which the following is a specification.

This invention relates to an improved cover for culinary vessels of that class which is provided with a handle and means for holding the cover on the vessel, so that the cover can be quickly removed or replaced as required during the cooking operation; and for this purpose the invention consists of a cover for culinary vessels provided at one or more points of its circumference with retaining lugs fitting over the rim of the vessel, while the handle of the vessel is provided with means for locking the cover in position on the rim, said locking means being readily disconnected from the cover whenever it is desired to remove the same or replaced thereon when the cover is to be placed in position on the vessel.

In the accompanying drawings, Figure 1 represents a perspective view of a culinary vessel with our improved cover shown in position thereon, Fig. 2 is a vertical central section through the upper part of the vessel cover and handle, showing the locking connection of the cover with the vessel, Fig. 3 is a detail side-view of one of the retaining lugs on the cover, Fig. 4 is a detail vertical transverse section on line 4, 4, Fig. 3, and Figs. 5 and 6 are respectively a detail side-elevation and a vertical transverse section on line 6, 6, Fig. 5, of a modified form of the locking clip.

Similar letters of reference indicate corresponding parts throughout the several views.

Referring to the drawings, $a$ represents a culinary vessel of any suitable size and shape, and $h$ the handle of the same, which is preferably made of concavo-convex cross-section and attached by the usual rivets to the body of the vessel.

The cover $b$ is made of the usual construction and provided at one or two points of its circumference with lugs $b^1$, which are made of a wire $b^2$ of suitable thickness that is bent outwardly into flat U-shape at the points where the lugs are to be formed, the remaining portion of the wire $b^2$ being inclosed by the rim of the cover, which rim is bent inwardly and clenched over the wire. The wire $b^2$ is extended all around the rim of the cover and serves for stiffening the same. To the handle $h$ is fulcrumed a locking clip $d$, which is so located that the end of the clip extends over the rim of the cover, the clip being acted upon at its outer end by a flat spring $d^1$ so that the inner end of the clip is pressed down on the rim of the cover. The lug or lugs $b^1$ are so placed on the edge of the cover that when the cover is placed in position they are approximately at diametrically opposite points from the handle, so that by the lugs $b^1$ in connection with the locking action of the clip on the cover the latter is prevented from dropping off the vessel when handling the same. When it is desired to remove the cover, the clip $d$ is depressed at its outer end and the inner end raised, so that the cover is released and can be removed from the vessel. When replacing the cover, the retaining lugs are placed under the rim of the vessel and then the clip raised so that the opposite side of the rim of the cover can be placed under the clip for being locked by the same.

In place of the fulcrumed and spring-actuated clip $d$, the clip shown in Figs. 5 and 6 may be used. This is composed of a sliding sleeve-shaped portion $e$ provided with a clip $e^1$ that can be slid over the rim of the cover when the sliding sleeve is moved on the handle near enough to the cover for permitting the engagement of the rim by the clip $e^1$. The sleeve $e$ is provided with an insulating button $e^2$ for permitting the forward or backward motion of the sleeve and clip on the handle $h$.

By locking the cover to the vessel in the manner described, the annoying dropping off of the cover during the cooking operation is prevented. The cover fits tightly on the vessel and facilitates thereby the handling of the vessel during the cooking operation.

Having thus described our invention, we claim as new and desire to secure by Letters Patent:

1. The combination with a culinary vessel having a laterally projecting rim and a laterally projecting handle, a cover having a downwardly extending rim fitting around the rim of the vessel, lugs on said cover and engaging under said rim of the vessel, a curved clip fulcrumed on the upper face of the handle and extending nearly parallel thereto and having a face engaging the upper side of the rim of the cover and a flat spring secured to the lower face of said clip and pressing against the upper face of the handle.

2. The combination, with a culinary vessel having a handle and an outwardly projecting beaded rim, of a cover having a downwardly extending rim adapted to fit around the rim of the vessel, lugs on the rim of the cover and adapted to engage under the rim of the cover, and a clip on said handle and having a face adapted to engage on the upper side of the rim of the cover to coöperate with said lugs to hold the rim of the cover around and said cover on the rim of the vessel.

3. The combination, with a culinary vessel having a handle and an outwardly projecting beaded rim, of a cover having a downwardly extending rim adapted to fit around the rim of the vessel, lugs on the rim of the cover and adapted to engage under the rim of the cover, and a spring-pressed pivoted clip on said handle and having a face adapted to engage on the upper side of the rim of the cover to coöperate with said lugs to hold the rim of the cover around, and said cover on, the rim of the vessel.

In testimony, that we claim the foregoing as our invention, we have signed our names in presence of two subscribing witnesses.

MAX PEARL.
CHARLES F. REINMANN.

Witnesses:
  PAUL GOEPEL,
  JOSEPHINE COOK.